(12) United States Patent
Meredith et al.

(10) Patent No.: US 9,283,996 B2
(45) Date of Patent: Mar. 15, 2016

(54) AIRFLOW BAFFLE FOR COMMERICAL TRUCK FUEL EFFICIENCY IMPROVEMENTS

(71) Applicant: AT&T MOBILITY II LLC, Atlanta, GA (US)

(72) Inventors: Sheldon Kent Meredith, Marietta, GA (US); Mario Kosseifi, Roswell, GA (US); John Pastore, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 2 days.

(21) Appl. No.: 14/305,642

(22) Filed: Jun. 16, 2014

(65) Prior Publication Data

US 2014/0292025 A1     Oct. 2, 2014

Related U.S. Application Data

(63) Continuation of application No. 13/715,004, filed on Dec. 14, 2012, now Pat. No. 8,777,297.

(51) Int. Cl.
*B62D 35/00* (2006.01)

(52) U.S. Cl.
CPC .................................... *B62D 35/001* (2013.01)

(58) Field of Classification Search
CPC ..................................................... B62D 35/001
See application file for complete search history.

(56) References Cited

U.S. PATENT DOCUMENTS

| 7,992,666 | B2 | 8/2011 | Otterstrom |
| 8,449,017 | B2 | 5/2013 | Boivin et al. |
| 2010/0194144 | A1 | 8/2010 | Sinha |
| 2011/0291440 | A1 | 12/2011 | Otterstrom |

OTHER PUBLICATIONS

Platform for Aerodynamic Road Transport, PART, 2012, p. 1-9.
Vehicle Aerodynamics, http://www.kasravi.com/cmu/tec452/Aerodynamics/VehicleAero.htm, Sep. 19, 2012, p. 1-16.
Sinha Deturbulator, http://www.sinhadeturb.com/trucks.asp, Sep. 19, 2012, p. 1-3.
Advanced Aerodynamic Trailer Technology, Richard M. Wood, SOLUS—Solutions and Technologies LLC, p. 1-29.
Simple and Low-Cost Aerodynamic Drag Reduction Devices for Tractor-Trailer Trucks, Wood et al. SOLUS—Solutions and Technologies, Oct. 8, 2001, p. 1-18.
Aerodynamic Research Revolutionizes Truck Design, http://spinoff.nasa.gov/Spinoff2008/t_3.html, Sep. 19, 2012, p. 1-4.
Evaluation of Splash and Spray Suppression Devices on Large Trucks During Wet Weather, Manser, Ph.D., et al., AAA Foundation for Traffic Safety, Oct. 2003, p. 1-56.

*Primary Examiner* — Lori L Lyjak
(74) *Attorney, Agent, or Firm* — Hoffmann & Baron, LLP

(57) ABSTRACT

An aerodynamic drag reduction device for use on an over-the-road cargo vehicle. The vehicle has a prismatically shaped cargo area, which includes a rear face of the cargo area substantially perpendicular to the direction of travel. The device comprises a plurality of resilient prongs arranged along a rear edge of the vehicle body, extending from a respective fixed end secured to the vehicle body rearward in a flow-wise direction beyond the rear edge of the vehicle body to a respective free end. Each prong is separated from an adjacent prong in the plurality, and each is flexible to permit deflection, under the influence of airflow over the vehicle at a predetermined speed, above and below a first plane defined by the surface of the vehicle to which the plurality of prongs is secured. Each prong is further resistant to deflecting in a direction parallel to the first plane.

37 Claims, 8 Drawing Sheets

AIRFLOW BAFFLE FOR COMMERICAL TRUCK FUEL EFFICIENCY IMPROVEMENTS

CROSS-REFERENCE TO RELATED APPLICATIONS

This application claims priority under 35 U.S.C. §120 as a continuation of pending U.S. patent application Ser. No. 13/715,004, filed 14 Dec. 2012, now allowed, the complete disclosure of which is incorporated by reference herein for all purposes.

BACKGROUND

1. Field of the Disclosure

The present disclosure relates to the field of transportation aerodynamics. More specifically, disclosed is an apparatus to improve aerodynamic and fuel efficiency of an over-the-road cargo vehicle.

2. Brief Discussion of Related Art

The predominant mode of transportation for commercial goods throughout the United States, the developed world and elsewhere is cargo truck, among these including a tractor-trailer truck. For this mode of transportation, fuel represents the largest single cost component. Therefore, any measureable improvement in fuel efficiency of such vehicles is worthwhile.

In particular, in the developed world, where tractor-trailer trucks travel long distances of well-developed highways at a generally high speed, aerodynamic drag represents a major source of inefficiency. One source of such aerodynamic inefficiency is the geometry of the truck, which is essentially an elongated rectangular prism. In particular, the airflow properties over the trailing edge of the trailer create a large trailing negative pressure vortex, which greatly contributes to drag.

One recent technology to improve aerodynamic efficiency is colloquially called a "boat tail". A boat tail is an attachment to the rear end of the trailer which acts as a fairing to gradually reduce the cross-sectional area of the trailer, and thus reduce the size and intensity of the trailing vortex and its associated drag. One investigation by the Platform for Aerodynamic Road Transport (PART), a research affiliate of the Delft University of Technology, Netherlands, suggests a boat tail can contribute a 4.5% improvement in fuel efficiency.

However, a boat tail as it is currently practiced has a practical size limit that still necessitates an abrupt geometry change at its trailing edge. Furthermore, a trailer is accessed via doors at its rear. Any sort of boat tail impedes access to such doors. For many such tractor/trailer trucks the container itself is transferable in order to be used by intermodal transportation (i.e., train, or cargo ship). In those circumstances, the aerodynamics are either substantially different (e.g. rail), or not even a concern (i.e., container ship). In such cases, the inviolable requirement is that the container keep its standardized size and shape, to enable its intermodal transfer. Permanent alterations to the shape of the trailer to improve efficiency are therefore impossible, to say nothing of the cost-effectiveness in construction of a box trailer. Even an aerodynamically effective successful boat tail should therefore be temporary, removable or interchangeable for most practical effect.

Furthermore, in loading or unloading, a road-use trailer is most commonly backed up to an elevated loading dock. Attempts to deal with this problem include making the boat tail inflatable, or foldable. Still, a boat tail remains an operational obstacle to loading and unloading.

Therefore, the present state of the art is lacking. Other solutions in place of or in addition to a boat tail may yield even better aerodynamic results and/or greater operational advantages.

SUMMARY

In order to overcome these and other weaknesses, drawbacks, and deficiencies in the known art, provided according to the present disclosure is an aerodynamic drag reduction device for use on an over-the-road cargo vehicle, the vehicle having a prismatically shaped cargo area, including a rear face of the cargo area substantially perpendicular to the direction of travel. The device includes a plurality of resilient prongs arranged along a rear edge of the vehicle body, each of the prongs extending from a respective fixed end secured to the vehicle body rearward in a flow-wise direction beyond the rear edge of the vehicle body to a respective free end. Each prong is separated from an adjacent prong in the plurality. Each prong is further flexible to permit deflection of the free end above and below a first plane defined by the surface of the vehicle to which the plurality of prongs is secured. Such deflection is caused by the properties of the airflow over the vehicle at a predetermined speed. Each prong is further resistant to deflecting in a direction parallel to the first plane.

Alternately or additionally, a shaft of each prong has a perpendicular cross section with an area moment of inertia that is lowest around a neutral axis of the cross section that is substantially parallel to the first plane.

Optionally, each prong may include a composite construction of two or more material sections, each material having a different modulus of elasticity. Each prong may optionally include a vulcanized rubber material in some embodiments. In certain embodiments, each prong has a substantially uniform cross-section. In others, each prong has a tapered cross-section, in height or width, or both. For certain embodiments of the present disclosure, each prong has radiused corners at its respective connection to the space separating it from an adjacent prong.

Further described according to the present disclosure, optionally the plurality of prongs are secured to the vehicle with the capability to be repositioned from a deployed position having the free ends extended beyond a rear edge of the vehicle body, to a retracted position having the free end nearer to or forward of the rear edge of the vehicle body. In some cases, the device is slideable in a flow-wise direction to reposition the prongs.

In other embodiments, the device is secured to a rotating frame member which is operative to be rotated between the deployed position and a retracted position. For certain rotatable deployed embodiments, the device is itself rotatable on the rotating frame member to maintain an orientation of the prongs in a rearward extending direction. Optionally, the rotating frame member may be securable in one of the deployed or the retracted positions.

BRIEF DESCRIPTION OF THE FIGURES

These and other embodiments of the present disclosure will become apparent from the following detailed description read in connection with the accompanying drawings, wherein.

DETAILED DESCRIPTION

Figure 1:
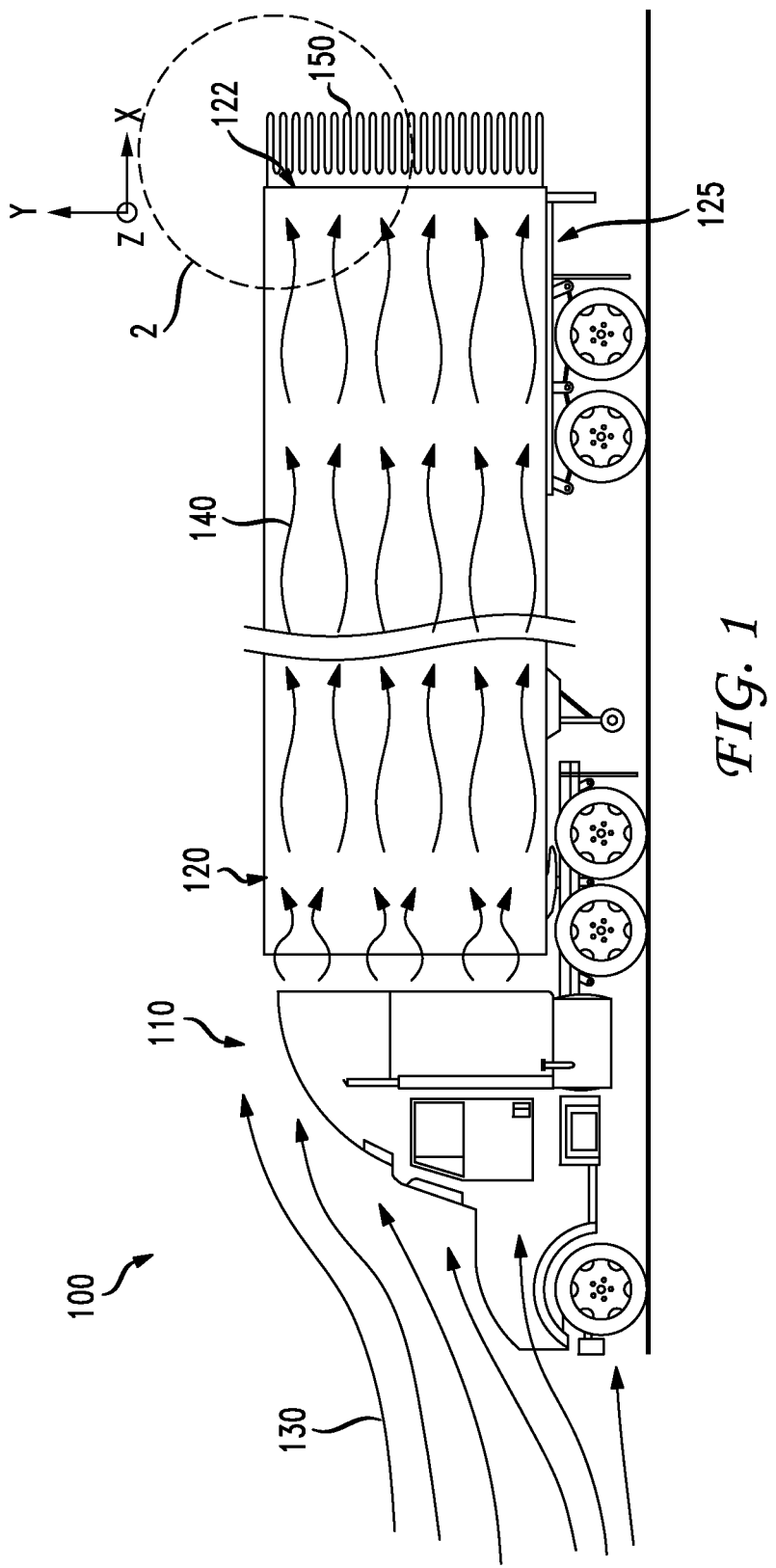
FIG. 1 illustrates a generally conventional tractor-trailer cargo truck, having added thereto a drag-reducing airflow baffle according to the present disclosure.

Referring now to FIG. 1, illustrated is a tractor-trailer truck, generally 100, the features of which are largely conventional. While a tractor-trailer 100 is described, the present disclosure will be seen as applicable to any cargo vehicle with a prismatic shape of the cargo section, for example and without limitation, a box truck, a car-pulled trailer, or the like. The tractor cab 110 includes a cabin for the operators and an engine (not shown) to power itself and pull one or more attached trailers 120. Airflow streamlines 130, 140 depict the flow of air over the truck 100 at generally highway speeds, e.g., 60 miles per hour (MPH) or roughly 95 kilometers per hour (kM/h).

Attached to the rear of the trailer 120 is an airflow baffle 150. Airflow baffle 150 is visible vertically in FIG. 1, being attached to a near side on the trailer 120. Not visible in FIG. 1, is a further baffle 150 that can be mounted vertically at the rear of trailer 120 along an opposite side facing away from the viewer. Another baffle 150 may be mounted horizontally across a top of the trailer 120, again extending rearward analogous to the baffle 150 shown in FIG. 1.

The prismatic geometry of a standard trailer 120, in particular the abrupt change of shape at its trailing end, creates a large low pressure vortex immediately behind the trailer 120 when there is airflow over the trailer 120, for example at highway speed. This low pressure vortex is a large contributor to aerodynamic drag. In order to minimize the drag associated with this trailing vortex it is advantageous to control or influence the flow of air into the space immediately behind the trailer.

Figure 2:
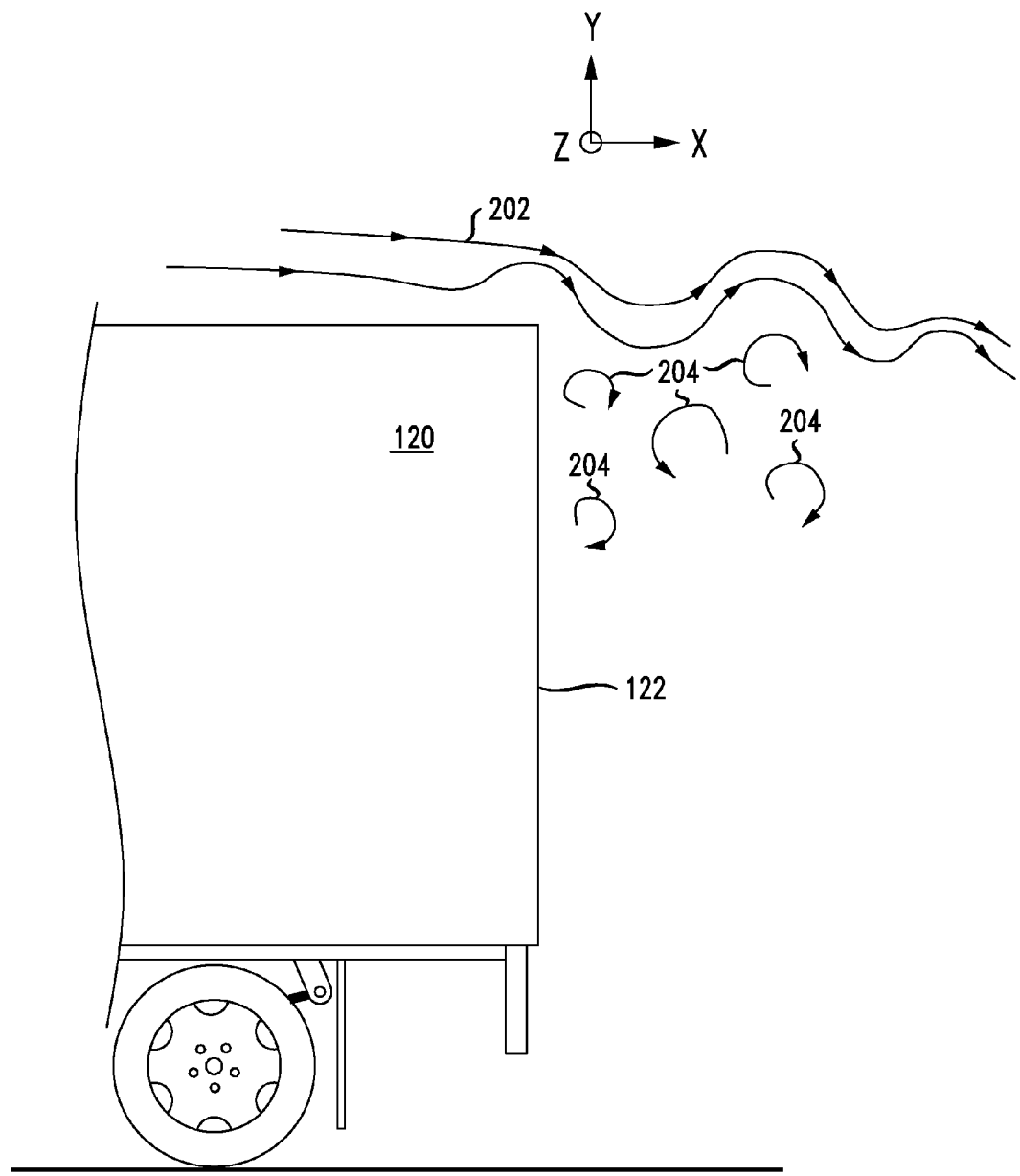
FIG. 2 illustrates a detailed view of the upper rear portion of the cargo truck indicated by circle 2 in FIG. 1.

With reference to FIG. 2, the upper rear end of the trailer 120 is depicted without any baffle 150 attached thereto to illustrate the typical airflow behavior. Experimental observation and computational fluid dynamics flow simulation indicates that, at the abrupt right-angle trailing edge of the trailer 120 the flow induced is characterized by a dynamic sinusoidal or wavelike pattern, generally indicated by streamlines 202. This flow pattern is dynamic in the sense that the wave pattern shifts with a sinusoidal or wavelike characteristic as flow over the trailer 120 separates from the trailer 120 and mixes with fluid behind the trailer 120. This sinusoidal or wavelike flow pattern is accompanied by mixing vortices 204. In order to delay the separation of airflow from the trailer, and thus reduce drag formed by the separation, it would be beneficial if the surface of the trailer could be made to move with the sinusoidal or wavelike flow pattern. In this manner, the mixing of airflow over the trailer 120 into the trailing vortex would be controlled, and distributed over a greater volume as the separation is extended behind the trailer 120. The intensity of the pressure differential behind the trailer 120 is therefore reduced, and with it the accompanying drag.

Figure 3:
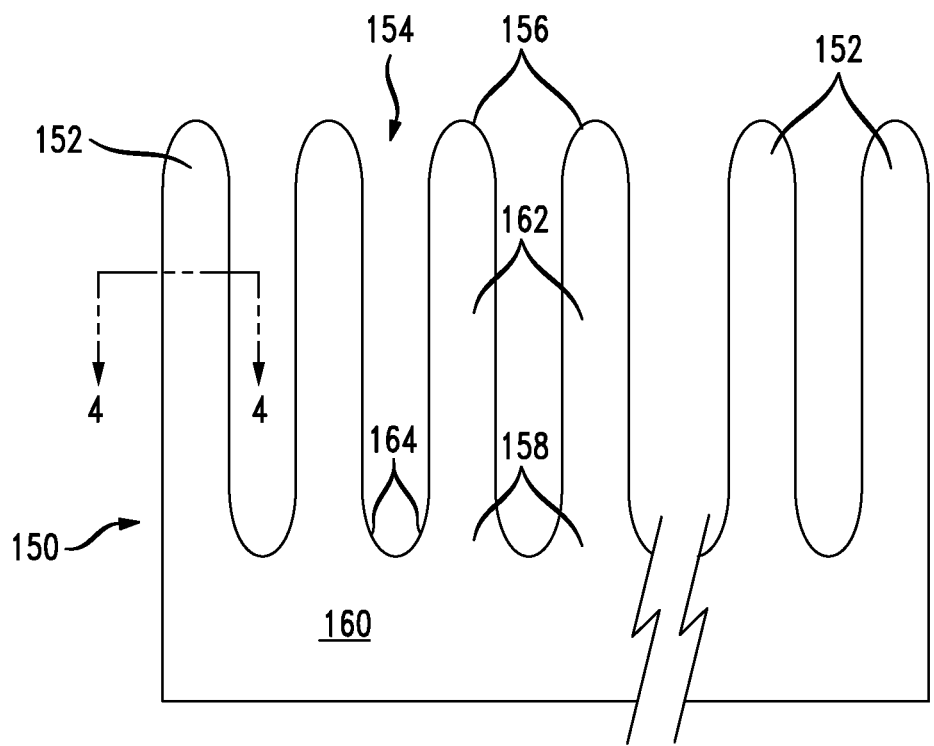
FIG. 3 illustrates a drag-reducing airflow baffle according to a first embodiment of the present disclosure.

Referring Now to FIG. 3, the flow baffle 150 provides prongs 152 that are positioned to extend in the flow-wise direction, generally aligned with a longitudinal axis of the trailer 120, which can be seen as extending in parallel to the x-axis direction as depicted in FIG. 1. Prongs 152 are separated from one another by spaces 154, which spaces allow respective free ends 156 of individual prongs 152 to move independently of one another. Opposite the free end 156 of each prong 152 is a fixed end 158. The free end 156 of each prong 152 is connected to a respective fixed end 158 by a shaft 162. Fixed ends 158 may be secured to one another and the baffle 150 in general by a common spine 160. The space between prongs 152 at the spine 160 may be provided with individual or blended fillets 164, in order to avoid stress concentration. Alternately or additionally, the fixed ends 158 may be secured to the trailer 120 itself.

In a very particular embodiment, the prongs 152 are approximately 2 inches in width, between about 0.5 to 1 inches in thickness, and up to about 14 inches in length. Spacing 154 between the prongs 152 can be about 1 inch. However, these dimensions are offered as an example only, and should not be taken to limit the scope of the disclosure. These and other relevant dimensions are left to the particular application as determined by those skilled in the art taken in light of Applicant's present disclosure.

The baffle 150 is secured to the trailer 120 to permit the shaft 162 of each prong 152 to extend, in whole or in part, rearward beyond a trailing edge of the trailer 120. Moreover, the prongs 152 are resiliently constructed to permit their flexure above or below a plane defined by a side surface of the trailer 120 to which they are secured. The degree of resiliency and flexure will be subject to adjustment according to the individual circumstances. Among the factors to be considered are the dimensions of the trailer 120, the design operating speed at which drag is to be minimized, resultant Reynolds number for the particular flow, etc. As a first order approximation, prongs 152 constructed of vulcanized rubber display what is considered to be an adequate degree of resiliency for the present application.

Composite makeup may be employed as well, for example the prongs having a core of a harder material, ductile metals, resilient plastics or the like, with additional flexibility afforded by a covering of more flexible material over this core. Optionally, some or all of the baffle 150 in gross may have the same composite construction as the prongs 152. The cross-sectional view of the prong 152 indicates a composite construction, including a core 168 having an alternate material, in particular a differing modulus of elasticity, as the material comprising the remainder of the prong 152. The cross-sectional shape of the core 168 need not necessarily conform to that of the prong 152 as a whole. Moreover, the length of the core 168 may optionally be less than that of the prong 152. The core 168 may have a uniform cross-section, or it may taper or otherwise change in cross-sectional area without regard to the shape of the prong 152.

The precise cross-sectional dimension of the prongs 152 will also affect the flexibility of the prongs 152. Generally speaking, it is considered desirable that the prongs have flexibility to deflect above or below the designated mounting plane, but only limited flexibility laterally within the mounting plane. To this end, the cross-sectional geometry should exhibit a greater area moment of inertia (alternately called second moment of area) around any axis extending out of the mounting plane as compared with the area moment of inertia around any axis lying in or parallel to the mounting plane. As a result, the prongs will resist flexing around any axis having a higher area moment of inertia, which can be by design an axis lying parallel to the mounting plane.

Figure 4:
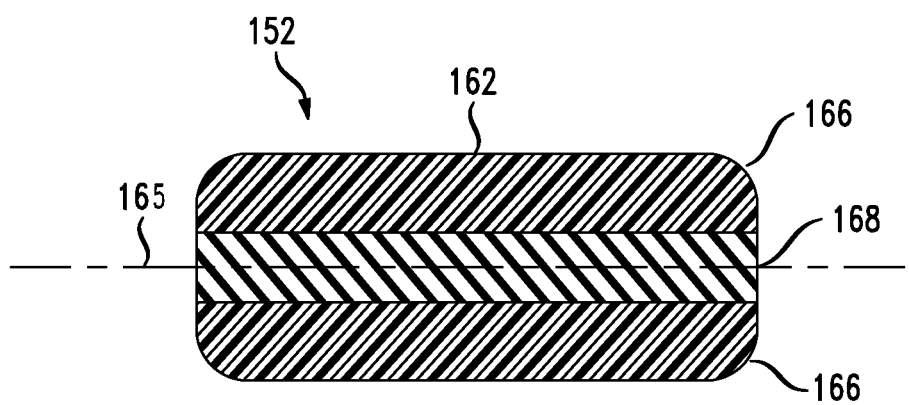
FIG. 4 illustrates a cross-section view of one baffle prong taken along line 4-4 of FIG. 3.

As an example only, and with reference to FIG. 4, a cross-section view of the prong 152 taken along section line 4-4 in FIG. 3, illustrates that the prong 152, and particularly its shaft 162, have a lowest area moment of inertia around the horizontal axis 165 passing through the center of the shaft 162. In certain embodiments, the corners 166 of the shaft 162 may be rounded to avoid stress concentrations and improve durability in service.

Figure 5:
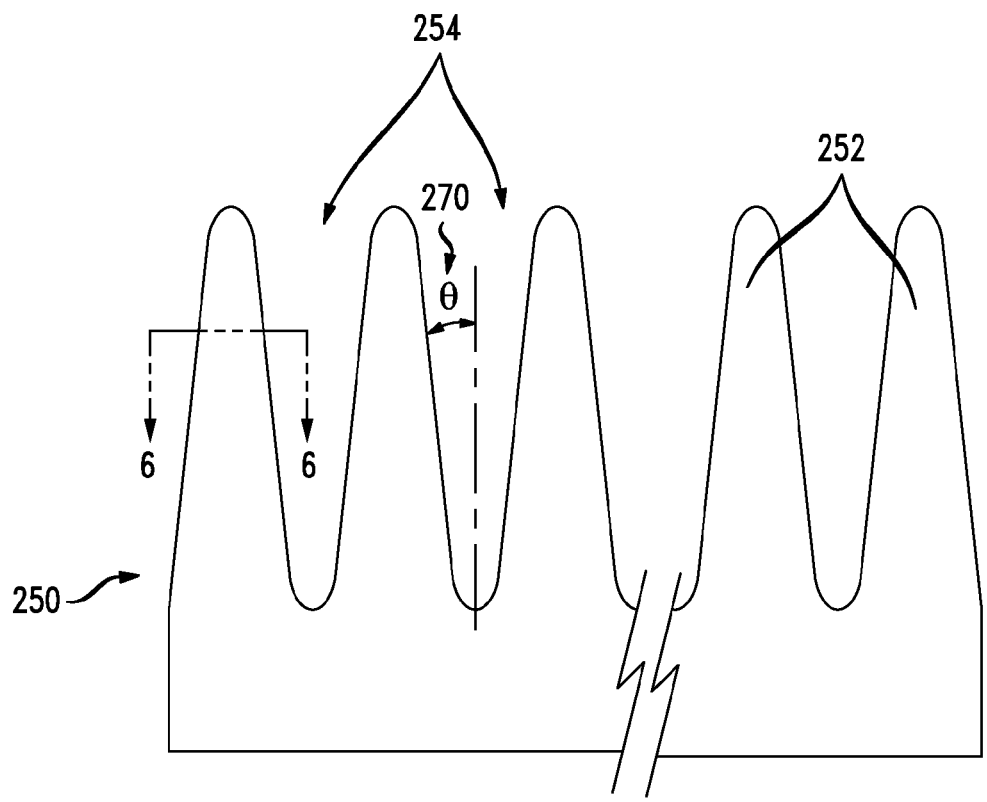
FIG. 5 illustrates a drag-reducing airflow baffle according to a second embodiment of the present disclosure.
Figure 6:
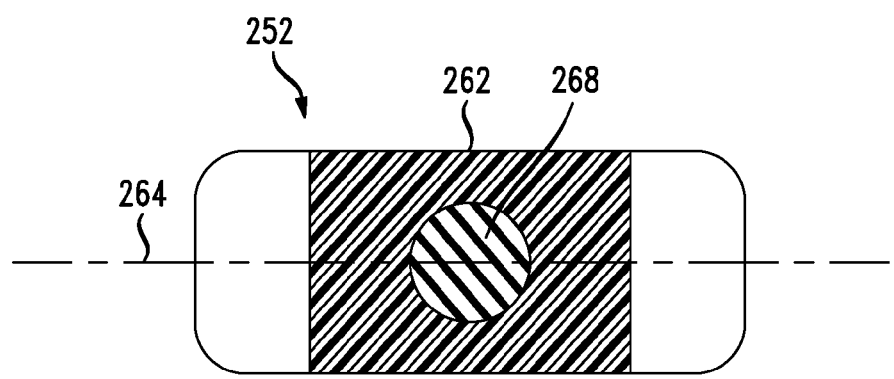
FIG. 6 illustrates a cross-section view of one baffle prong taken along line 6-6 of FIG. 5.

Referring now to FIG. 5, illustrated is an alternate embodiment of a baffle, generally 250. A full description of the features common with the foregoing embodiment of FIGS. 3-4 will be apparent to those skilled in the art, and the following description will highlight the differences therewith. Baffle 250 has prongs 252 separated from one another by spaces 254. The shaft 262 of each prong 252 is tapered in its width at it extends rearwardly in a flow-wise direction, with a taper angle 270 defined by θ. FIG. 6 is a cross-section view of the prong 252 taken along section line 6-6 in FIG. 5. Here again, the prong 252, and particularly its shaft 262, have a lowest moment of inertia around the horizontal axis 264 passing through the center of the shaft 262. Accordingly, they will tend to flex above or below the mounting plane, and resist lateral deflection within or parallel to the mounting plane. Alternately or additionally, the prong cross-section may be tapered in height to influence the propensity of the prong to defect vertically (as viewed in FIG. 4 or 6 only; the prepared axis of deflection will generally be laterally for baffles installed on a side surface of the trailer) rather than horizontally.

The cross-sectional view of the prong 252 indicates a composite construction, including a core 268 having an alternate material, in particular a differing modulus of elasticity, as the material comprising the remainder of the prong 252. Notably, the cross-sectional shape of the core 268 need not necessarily conform to that of the prong 252 as a whole. Moreover, the length of the core 268 may optionally be less than that of the prong 252. The core 268 may have a uniform cross-section, or it may taper or otherwise change in cross-sectional area without regard to the shape of the prong 252.

A trailer 120 fitted with one or more baffles 150, 250, obtains its benefit of drag reduction in transit at highway speeds. However, such a trailer 120 should preferably be compatible with the existing trucking infrastructure in other phases of operation, namely loading and unloading. Loading and unloading of the trailer 120 is most commonly accomplished by one or more doors at the rear face 122 of the trailer 120. Moreover, for this purpose, a raised loading dock (not shown) is commonly provided level with the bottom 125 of the trailer 120. The height of such a dock is generally standardized. In order for the trailer 120 to be backed into position adjacent to such a loading dock for loading and unloading, it is desirable that the baffles 150 or 250 be retractable such that they do not extend beyond the rear face 122 of the trailer 120.

Figure 7:
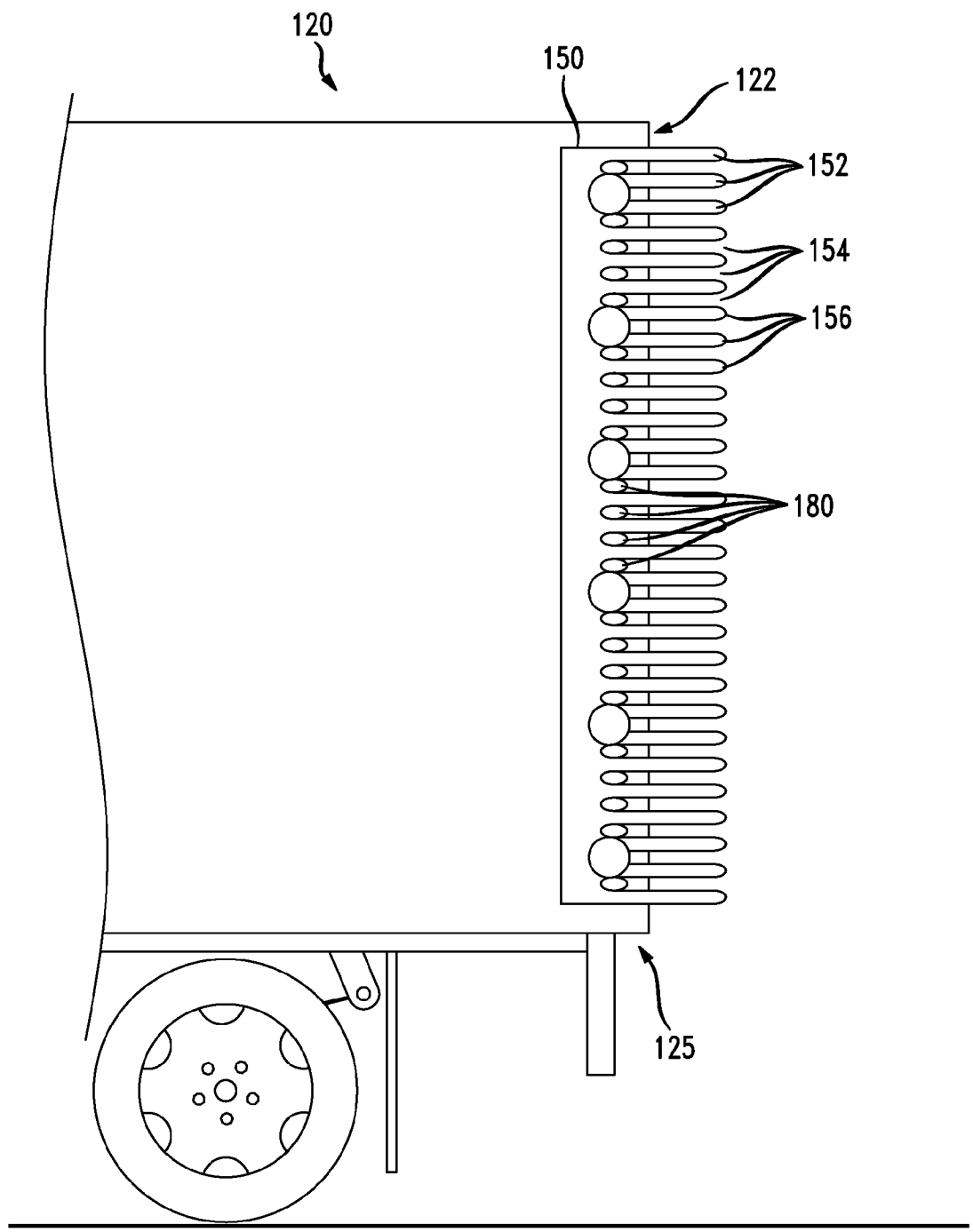
FIG. 7 illustrates on embodiment of a baffle-retracting scheme according to the present disclosure.

Referring now to FIG. 7, illustrated is a mounting arrangement where the baffle 150 is mounted to the trailer 120 in a manner that permits the baffle 150 to be shifted along a longitudinal axis of the trailer 120. In particular, a plurality of pegs 180 is provided on the trailer 120, which fit respectively into one or more of in spaces 154 between adjacent prongs 152. Accordingly, the baffle 150 can slide longitudinally along the trailer 120 from a position with free ends 156 extended beyond the rear face 122 of the trailer 120, as shown in FIG. 7, to a retracted position having the free ends 156 longitudinally forward of the trailer rear face 122 (not shown). Moreover, the baffle 150 may be adapted to be secured in one of several intermediate positions as well. With the baffle 150 retracted, it does not impact nor interfere with the trailer 120 backing into a loading dock, nor access to the trailer 120 from the loading dock. The baffle 150 may be secured in the extended, retracted, or any intermediate position by any number of conventional means known in the art.

Figure 8A:
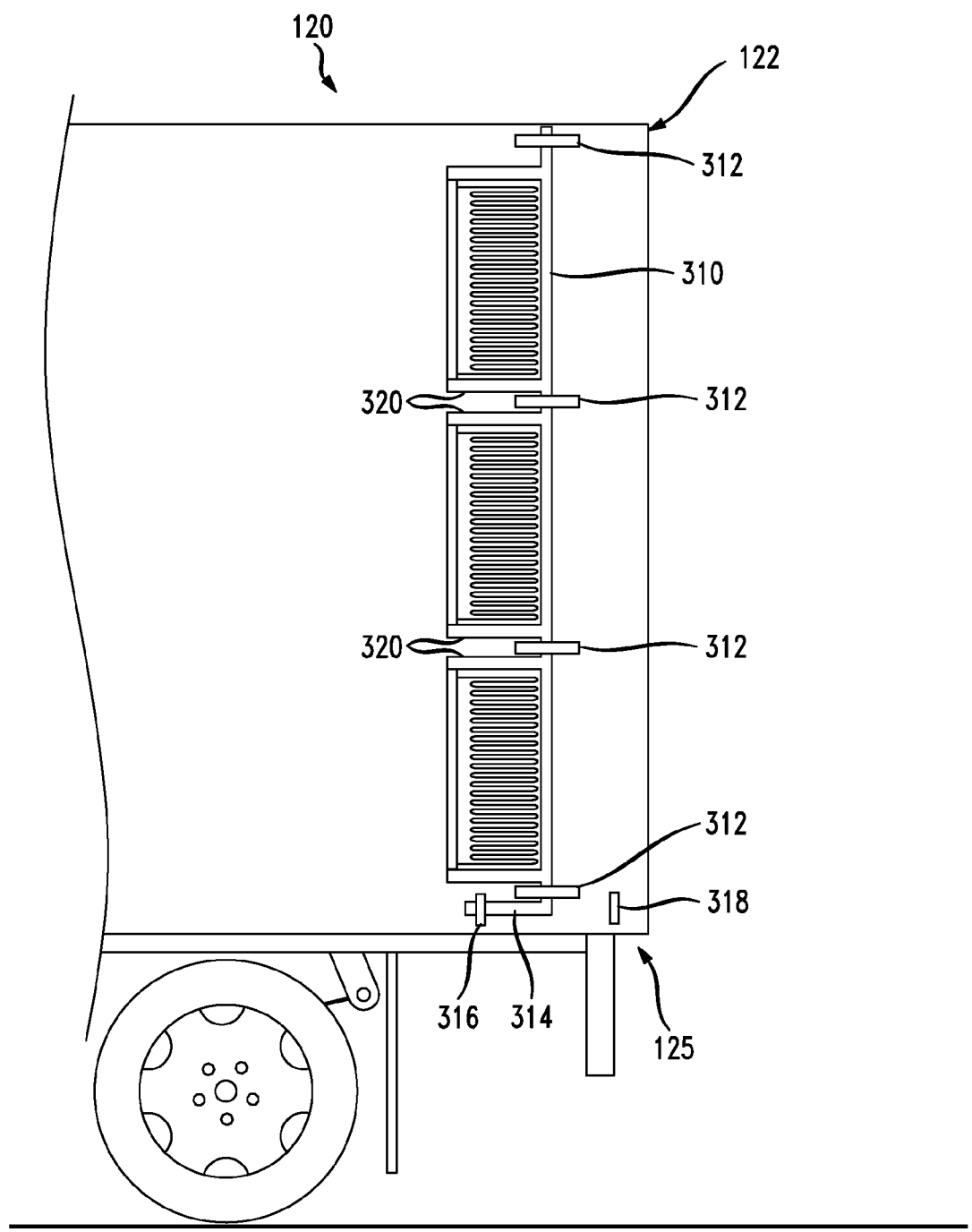
FIG. 8A illustrates a second embodiment of a baffle-retracting scheme according to the present disclosure, having the baffle retracted.
Figure 8B:
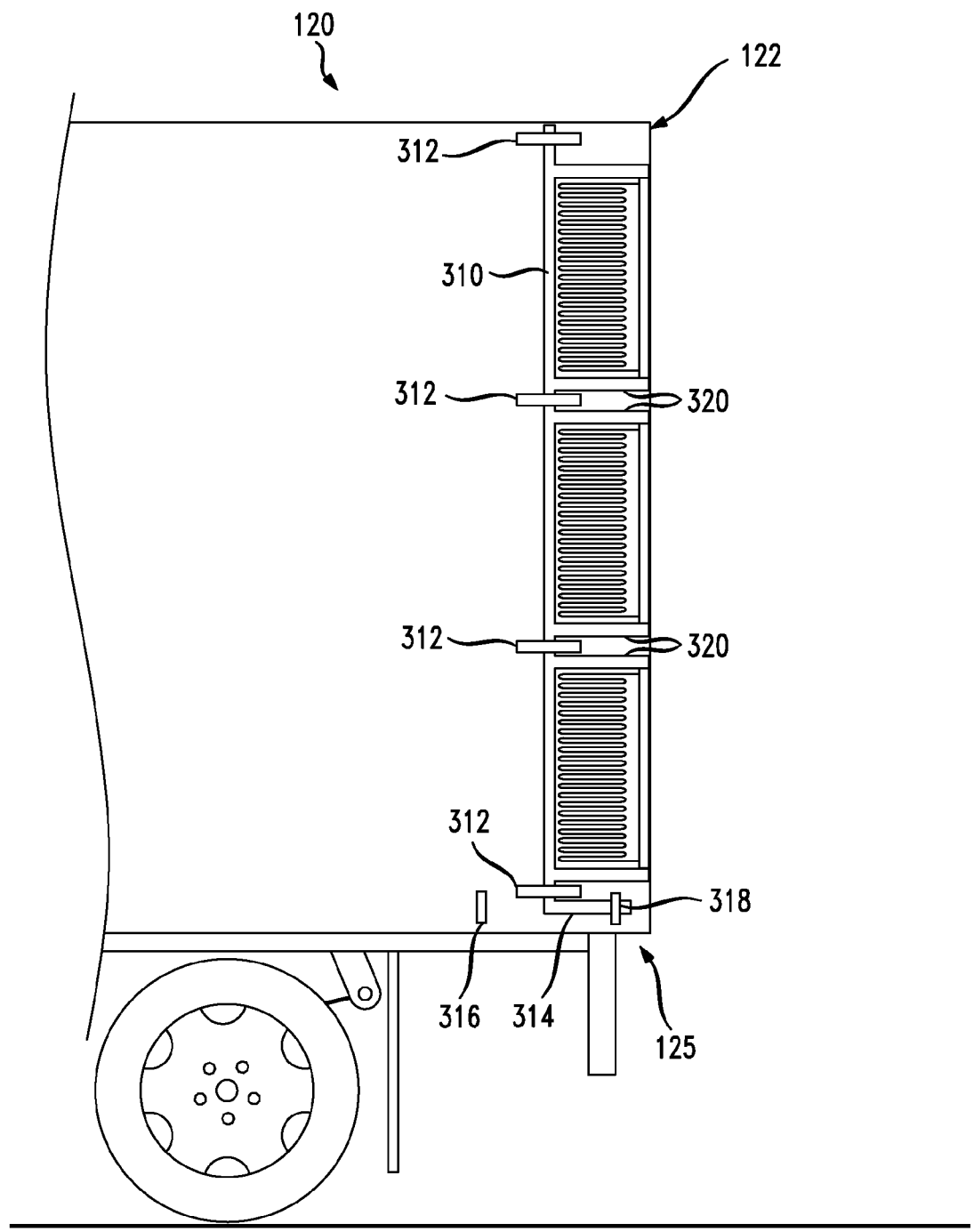
FIG. 8B illustrates the second embodiment of a baffle-retracting scheme according to the present disclosure, having the baffle in an intermediate position.
Figure 8C:
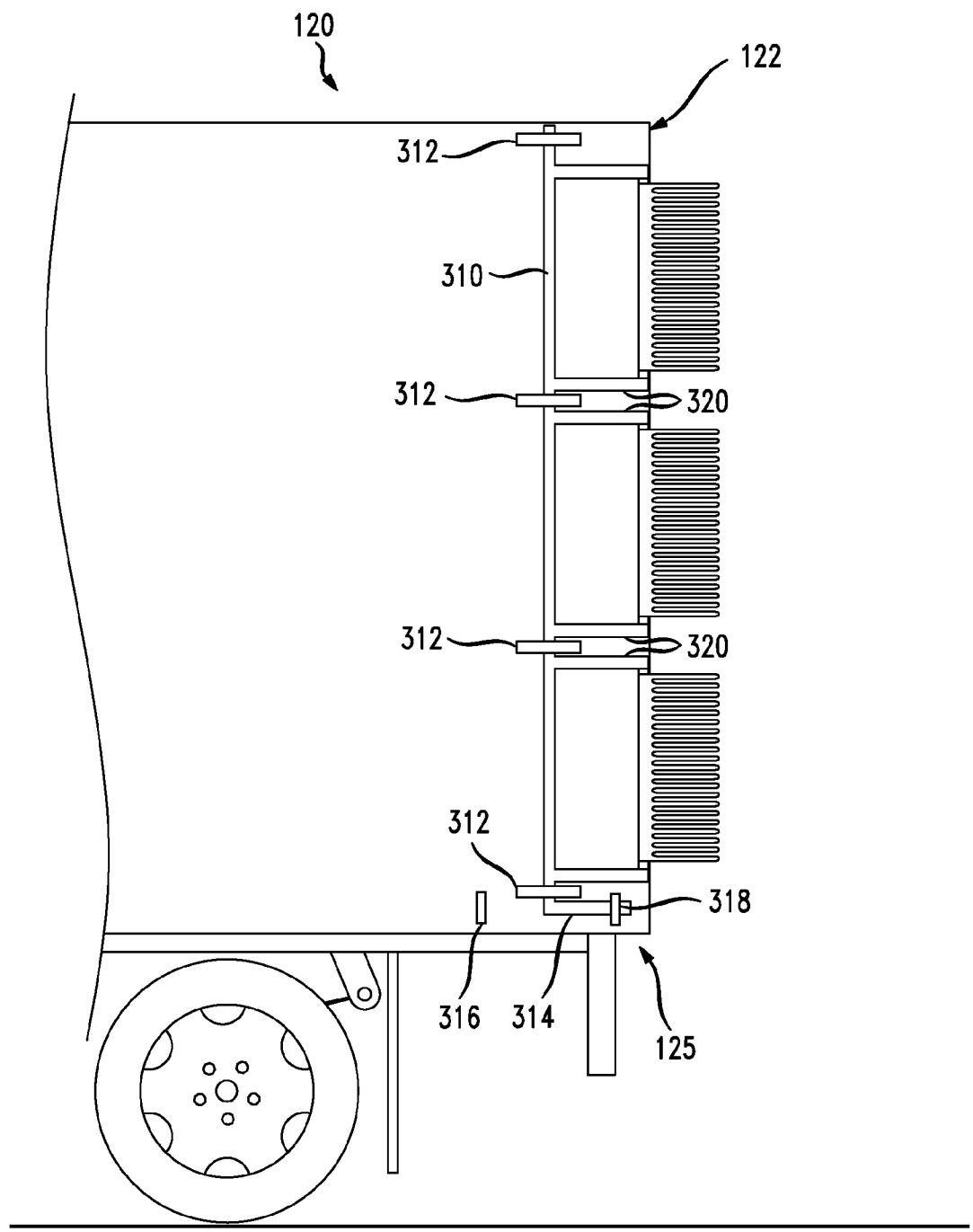
FIG. 8C illustrates the second embodiment of a baffle-retracting scheme according to the present disclosure, having the baffle deployed.

FIGS. 8A-8C illustrate an alternate mounting embodiment for baffles 150. In this embodiment, one or more baffles 150 are mounted to a pivoting frame 310. The pivoting frame is mounted to the trailer by a plurality of mounts 312. A handle 314 is attached to the frame 310 to allow a user to pivot the frame 310 between retracted and deployed positions. One or more handle latches 316, 318 are provided to hold the handle 314, and thereby the frame 310, in either the retracted or extended positions, respectively.

Baffles 150 are carried by the frame 310 on arms 320, such that a rotation of the frame 310 from its retracted position illustrated in FIG. 8A, to an intermediate position illustrated in FIG. 8B, places the baffles 150 with the fixed ends 158 in proximity to the rear face 122 of the trailer 120. From this intermediate position of FIG. 8B, in this particular embodiment, the baffles 150 may be mounted to the arms 320 in a pivotal manner, such that the baffles 150 are rotated into an operating position illustrated in FIG. 8C, having the free ends 156 of the prongs 152 extending rearward beyond the rear face 122 of the trailer 120. Thus, with the frame 310 holding the baffles 150 in their retracted position of FIG. 8A, the baffles 150 may nonetheless be stowed with the free ends 156 of the prongs 152 generally aligned with a direction of airflow. In other embodiments, the operator of the trailer 120 might find it convenient to operate the trailer 120 with the baffles 150 in a position having the prongs 152 forward-facing.

The foregoing examples of baffle retraction in FIGS. 7, 8 are depicted on a side surface of the trailer 120. They will be understood to be equally applicable to the opposing side surface and/or a top surface of the trailer 120 as well. Furthermore, the baffle 150 as described herein will be seen as equally applicable to other vehicles, or portions thereof, including for example and without limitation the arrangement of a baffle 150 or 250 as described herein to the tractor cab 110.

It will be appreciated that variants of the above-disclosed embodiments and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An aerodynamic drag reduction device, the aerodynamic drag reduction device comprising:
   a fixed portion;
   a free portion; and
   a plurality of prongs, the plurality of prongs configured to be mounted to a rear portion of a cargo transporter, the plurality of prongs being resilient, the plurality of prongs extending from the fixed portion rearward beyond the rear portion of the cargo transporter when mounted to the cargo transporter and in a deployed position, a portion of each of the plurality of prongs being separated from each other.

2. The aerodynamic drag reduction device according to claim 1, wherein a shaft of one of the plurality of prongs comprises a perpendicular cross-section, a first neutral axis associated with the perpendicular cross-section being parallel to a first plane, the first plane being defined by a surface of the vehicle adjacent to which the plurality of prongs is held, the plurality of prongs being resistant to deflection in a direction parallel to the first plane, an area moment of inertia associated with the perpendicular cross-section being a minimum around the first neutral axis.

3. The aerodynamic drag reduction device according to claim 1, wherein one of the plurality of prongs comprises a plurality of materials, each of the plurality of materials having a different modulus of elasticity.

4. The aerodynamic drag reduction device according to claim 1, wherein one of the plurality of prongs comprises a uniform cross-section.

5. The aerodynamic drag reduction device according to claim 1, wherein one of the plurality of prongs comprises a tapered cross-section.

6. The aerodynamic drag reduction device according to claim 1, wherein one of the plurality of prongs is tapered in width.

7. The aerodynamic drag reduction device according to claim 1, wherein one of the plurality of prongs is tapered in height.

8. The aerodynamic drag reduction device according to claim 1, wherein one of the plurality of prongs has a radiused corner.

9. The aerodynamic drag reduction device according to claim 1, wherein one of the plurality of prongs is secured to the cargo transporter to enable repositioning from the deployed position in which the free portion extends beyond the rear portion of the cargo transporter to a retracted position in which the free portion is nearer to the rear portion of the cargo transporter than in the deployed position.

10. The aerodynamic drag reduction device according to claim 1, wherein the aerodynamic drag reduction device is slideable in a flow-wise direction associated with the cargo transporter, thereby enabling the plurality of prongs to be repositioned.

11. The aerodynamic drag reduction device according to claim 1, wherein the aerodynamic drag reduction device is secured to a rotating frame member, the rotating frame member enabling the aerodynamic drag reduction device to be rotated between the deployed position and a retracted position.

12. The aerodynamic drag reduction device according to claim 1, wherein the aerodynamic drag reduction device is secured to a rotating frame member, the rotating frame member enabling the aerodynamic drag reduction device to be rotated such that the plurality of prongs extend in a rearward direction from the cargo transporter.

13. An aerodynamic drag reduction device, comprising:
a spine;
a plurality of prongs, the plurality of prongs being resilient, each of the plurality of prongs comprising a fixed portion, an elongated shaft, and a free portion, the fixed portion being attached to the spine, the free portion opposing the fixed portion on the elongated shaft, a portion of each of the plurality of prongs being separated from each other.

14. The aerodynamic drag reduction device according to claim 13, wherein the elongated shaft comprises a perpendicular cross-section, a first neutral axis associated with the perpendicular cross-section being parallel to a first plane, the spine being disposed in the first plane, the plurality of prongs being resistant to deflection in a direction parallel to the first plane, an area moment of inertia associated with the perpendicular cross-section being a minimum around the first neutral axis.

15. The aerodynamic drag reduction device according to claim 13, wherein one of the plurality of prongs comprises a plurality of materials, each of the plurality of materials having a different modulus of elasticity.

16. The aerodynamic drag reduction device according to claim 13, wherein one of the plurality of prongs comprises a uniform cross-section.

17. The aerodynamic drag reduction device according to claim 13, wherein one of the plurality of prongs comprises a tapered cross-section.

18. The aerodynamic drag reduction device according to claim 13, wherein one of the plurality of prongs is tapered in width.

19. The aerodynamic drag reduction device according to claim 13, wherein one of the plurality of prongs is tapered in height.

20. The aerodynamic drag reduction device according to claim 13, wherein one of the plurality of prongs has a radiused corner.

21. The aerodynamic drag reduction device according to claim 13, wherein one of the plurality of prongs comprises vulcanized rubber.

22. A cargo transporter comprising:
a cargo area, the cargo area comprising a rear portion, the rear portion being disposed rearward of the cargo transporter with respect to a forward direction of travel associated with the cargo transporter; and
an aerodynamic drag reduction device mounted to the rear portion of the cargo area, the aerodynamic drag reduction device comprising a plurality of prongs, each of the plurality of prongs having a fixed portion, an elongated shaft, and a free portion, the fixed portion being configured to be mounted to the rear portion of the cargo area, the free portion opposing the fixed portion on the elongated shaft, the fixed portion extending rearward beyond the rear portion of the cargo area when mounted to the cargo transporter and in a deployed position, a portion of each of the plurality of prongs being separated from each other, the plurality of prongs being flexible.

23. The cargo transporter according to claim 22, wherein the aerodynamic drag reduction device is secured to the cargo transporter to enable repositioning of the aerodynamic drag reduction device from the deployed position in which the free portion extends beyond the cargo area to a retracted position in which the free portion is nearer to the rear portion of the cargo area than in the deployed position.

24. The cargo transporter according to claim 22, wherein the aerodynamic drag reduction device is slideable in a flow-wise direction associated with the cargo transporter, thereby enabling the aerodynamic drag reduction device to be repositioned.

25. The cargo transporter according to claim 22, wherein the aerodynamic drag reduction device is secured to a rotating frame member, the rotating frame member enabling the aerodynamic drag reduction device to be rotated between the deployed position and a retracted position.

26. The cargo transporter according to claim 22, wherein the aerodynamic drag reduction device is secured to a rotating frame member, the rotating frame member enabling the aerodynamic drag reduction device to be rotated such that the plurality of prongs extends in a rearward direction from the cargo transporter.

27. The cargo transporter according to claim 23, wherein a rotating frame member is securable with the aerodynamic drag reduction device in the deployed position.

28. The cargo transporter according to claim 23, wherein a rotating frame member is securable with the aerodynamic drag reduction device in the retracted position.

29. The cargo transporter according to claim 22, wherein the elongated shaft comprises a perpendicular cross-section, a first neutral axis associated with the perpendicular cross-section being parallel to a first plane, the first plane being defined by a surface of the vehicle at the rear portion, the plurality of prongs being resistant to deflection in a direction parallel to the first plane, an area moment of inertia associated with the perpendicular cross-section being a minimum around the first neutral axis.

30. The cargo transporter according to claim 22, wherein one of the plurality of prongs comprises a plurality of materials, each of the plurality of materials having a different modulus of elasticity.

31. The cargo transporter according to claim 22, wherein one of the plurality of prongs comprises a uniform cross-section.

32. The cargo transporter according to claim 22, wherein one of the plurality of prongs comprises a tapered cross-section.

33. The cargo transporter according to claim 22, wherein one of the plurality of prongs is tapered in width.

34. The cargo transporter according to claim 22, wherein one of the plurality of prongs is tapered in height.

35. The cargo transporter according to claim 22, wherein one of the plurality of prongs has a radiused corner.

36. The aerodynamic drag reduction device according to claim 1, wherein the cargo transporter comprises one of a vehicle, truck, trailer, tractor-trailer, cargo vehicle.

37. The cargo transporter according to claim 22, wherein the cargo transporter comprises one of a vehicle, truck, trailer, tractor-trailer, cargo vehicle.

* * * * *